US008462376B2

(12) United States Patent
Shiokawa

(10) Patent No.: US 8,462,376 B2
(45) Date of Patent: Jun. 11, 2013

(54) IMAGE FORMING APPARATUS AND COMPUTER-READABLE MEDIUM

(75) Inventor: Yukiharu Shiokawa, Hiratsuka (JP)

(73) Assignee: Konica Minolta Business Technologies, Inc. (JP)

(*) Notice: Subject to any disclaimer, the term of this patent is extended or adjusted under 35 U.S.C. 154(b) by 736 days.

(21) Appl. No.: 12/133,029

(22) Filed: Jun. 4, 2008

(65) Prior Publication Data

US 2009/0086271 A1 Apr. 2, 2009

(30) Foreign Application Priority Data

Sep. 28, 2007 (JP) ................................. 2007-255510

(51) Int. Cl.
*G06K 15/00* (2006.01)
(52) U.S. Cl.
USPC .......................................... 358/1.16; 358/1.17
(58) Field of Classification Search
USPC .............. 358/1.13, 1.6, 1.14, 1.16, 1.18, 1.17
See application file for complete search history.

(56) References Cited

U.S. PATENT DOCUMENTS

| 5,848,261 | A  | * | 12/1998 | Farry et al. .................... 703/23 |
| 6,832,010 | B2 | * | 12/2004 | Miyazaki et al. ............. 382/305 |
| 7,142,730 | B2 | * | 11/2006 | Michiie et al. ................ 382/305 |
| 7,148,984 | B2 | * | 12/2006 | Niitsuma ...................... 358/1.15 |
| 7,382,938 | B2 | * | 6/2008  | Kizaki et al. .................. 382/305 |
| 7,460,253 | B2 | * | 12/2008 | Osada .......................... 358/1.13 |
| 7,612,906 | B2 | * | 11/2009 | Toda ............................ 358/1.16 |
| 7,978,348 | B2 | * | 7/2011  | Aoki ............................ 358/1.13 |
| 2002/0154337 | A1 | * | 10/2002 | Sakata ......................... 358/1.16 |
| 2003/0184803 | A1 | * | 10/2003 | Yamada et al. .............. 358/1.16 |
| 2005/0012770 | A1 | * | 1/2005  | Endo .............................. 347/19 |
| 2005/0168765 | A1 | * | 8/2005  | Akune et al. ................. 358/1.13 |
| 2005/0275864 | A1 | * | 12/2005 | Sugimura et al. ........... 358/1.13 |
| 2006/0055975 | A1 |   | 3/2006  | Toda |
| 2007/0081182 | A1 | * | 4/2007  | Shiohara ..................... 358/1.13 |
| 2007/0121161 | A1 | * | 5/2007  | Yamada ....................... 358/1.16 |
| 2007/0279689 | A1 | * | 12/2007 | Aoki et al. ................... 358/1.16 |
| 2008/0007756 | A1 | * | 1/2008  | Tanaka et al. ............... 358/1.13 |
| 2008/0297849 | A1 | * | 12/2008 | Fukasawa ................... 358/1.16 |

FOREIGN PATENT DOCUMENTS

JP 5-84987 A 4/1993

OTHER PUBLICATIONS

Chinese Office Action for Chinese Application No. 200810161429.3, issued Sep. 21, 2011, with English translation.

* cited by examiner

*Primary Examiner* — Twyler Haskins
*Assistant Examiner* — Jonathan Beckley
(74) *Attorney, Agent, or Firm* — Cantor Colburn LLP

(57) ABSTRACT

Disclosed an image forming apparatus to form an image on a basis of an image data file stored in an external memory, including: an expansion memory to expand the image data file; a memory residual capacity calculating section to calculate a residual capacity of the expansion memory; a memory occupying amount predicting section to predict a memory occupying amount necessary to expand the image data file into the expansion memory; a specification section to specify an image formable image data file which is processable by the image forming apparatus among the image data files stored in the external memory on a basis of the residual capacity of the expansion memory and the memory occupying amount, and a display controlling section to display a file name of the specified image formable image data file in a display section.

11 Claims, 9 Drawing Sheets

FIG.6

| IMAGE-FORMABLE FILE NAME | IMAGE FORMATION STARTING TIME | FILE SIZE |
|---|---|---|
| RETURN(EXIT) | | |
| | | |
| SORT(REARRANGE) | | |
|   FILE NAME | | |
|   IMAGE FORMATION STARTING TIME | | |
|   FILE SIZE | | |
| | | |
| ▷  FOLDER_1 | | |
| | | |
| ▷  FOLDER_2 | | |
|    ▶  FOLDER_21 | | |
|       FileName_211.pdf | 10 SECONDS | 48 KB |
|       FileName_212.jpg | 32 SECONDS | 970 KB |
| ▷  FOLDER_3 | | |
|     FileName_3_1.tif | 05 SECONDS | 28 KB |
| FileName_01.tif | 09 SECONDS | 69 KB |
| FileName_02.pdf | 23 SECONDS | 862 KB |
| FileName_03.jpg | 86 SECONDS | 1568 KB |

FIG.9

| FILE NAME | FILE SIZE | CONDITION ITEM COMBINATION | IMAGE FORMATION POSSIBLE/IMPOSSIBLE | IMAGE FORMATION STARTING TIME |
|---|---|---|---|---|
| FileName_1 | 77 KB | CONDITION A : OFF<br>CONDITION B : OFF<br>CONDITION C : OFF | ○ | 10 SECONDS |
| | | CONDITION A : ON<br>CONDITION B : OFF<br>CONDITION C : OFF | ○ | 13 SECONDS |
| | | CONDITION A : OFF<br>CONDITION B : ON<br>CONDITION C : OFF | × | — |
| | | CONDITION A : OFF<br>CONDITION B : OFF<br>CONDITION C : ON | ○ | 23 SECONDS |
| | | ... | | |

187

IMAGE FORMING APPARATUS AND COMPUTER-READABLE MEDIUM

CROSS-REFERENCE TO RELATED APPLICATION

The present U.S. patent application claims a priority under the Paris Convention of Japanese patent application No. 2007-255510 filed on Sep. 28, 2007, which shall be a basis of correction of an incorrect translation.

BACKGROUND

1. Field of the Invention

The present invention relates to an image forming apparatus and a computer-readable medium.

2. Description of Related Art

In recent years, the so-called memory direct printing function has been used. The memory direct printing function is to form an image by directly connecting an external memory, such as a Universal Serial Bus (USB) memory, in which image data file is previously saved, to an image forming apparatus without using personal computer (PC). In such image forming apparatus, when the external memory is connected to the image forming apparatus, the file names of image data files saved in the external memory are displayed on the display panel. Then, a user selects a file that the user wants to print among the displayed file names, so that an image is formed on the basis of the selected file.

Moreover, a printer to receive the transfer of data from a host machine was proposed (see, Japanese Patent Application Laid-Open Publication No. Hei 05-084987). The proposed printer calculates the residual capacity of the internal memory of the printer, and converts the residual capacity indicating how much printing can be performed to the pages to be printed from now on or to the pages now being printed into the number of characters or size of an image so as to inform the host machine of the residual capacity by the converted number or the converted size. The printer also sequentially displays the residual capacity of the internal memory on the display section thereof.

However, because the conventional image forming apparatus having the memory direct printing function displays all the file names of the files having image formable data formats, there has been a case where an image cannot be formed owing to the lack of the residual memory capacity after the selection of a file.

SUMMARY

The present invention was achieved in view of the aforesaid problem of the conventional technique, and the object of the present invention is to improve the usability at the time of image formation of an image data file stored in an external memory.

To achieve at least one of the abovementioned objects, an image forming apparatus to form an image on a basis of an image data file stored in an external memory, according to one embodiment that reflects one of aspects of the present invention, includes: an expansion memory to expand the image data file; a memory residual capacity calculating section to calculate a residual capacity of the expansion memory; a memory occupying amount predicting section to predict a memory occupying amount necessary to expand the image data file into the expansion memory; a specification section to specify an image formable image data file which is processable by the image forming apparatus among the image data files stored in the external memory on a basis of the residual capacity of the expansion memory and the memory occupying amount, and a display controlling section to display a file name of the specified image formable image data file in a display section.

Preferably, in the image forming apparatus, the display controlling section further displays at least one of a data format, a file size, and a time necessary for starting image formation of the image formable image data file in the display section.

Preferably, in the image forming apparatus, the display controlling section further displays an image forming condition settable for the image formable image data file in the display section.

Preferably, in the image forming apparatus, the expansion memory is an internal memory provided in the image forming apparatus and/or the external memory.

Preferably, the image forming apparatus further including a selection section for selecting whether to delete a temporary file generated on a basis of the image data file from the external memory or not in a case of using the external memory as the expansion memory, wherein the display controlling section displays a file name of the temporary file together with the file name of the image formable image data file in the display section when the temporary file is selected not to be deleted from the external memory.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein:

FIG. 6 is a view showing a display example of a file selecting screen;

FIG. 9 is a view showing a display example of an image forming condition selecting screen.

DETAILED DESCRIPTION OF THE PREFERRED EMBODIMENT

In the following, an embodiment of an image forming apparatus according to the present invention will be described with reference to the attached drawings.

Figure 1:
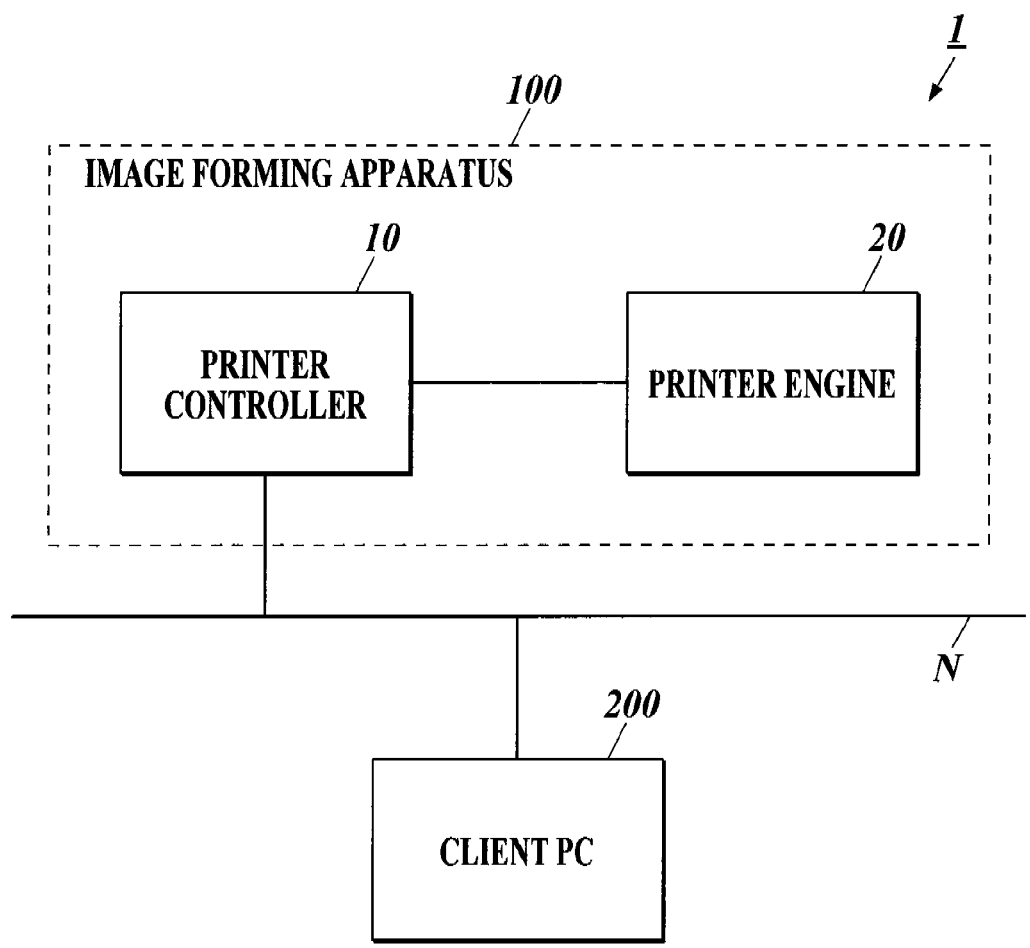
FIG. 1 is a system configuration diagram of an image forming system including an image forming apparatus of an embodiment of the present invention.

FIG. 1 shows the system configuration of an image forming system 1 including an image forming apparatus 100 of the embodiment of the present invention. As shown in FIG. 1, the image forming system 1 is composed of the image forming apparatus 100 and a client PC 200. The image forming apparatus 100 and the client PC 200 is connected to each other through a network N in a state capable of performing data communications.

The image forming apparatus 100 is equipped with a printer controller 10 and a printer engine 20, and forms an image on the basis of image data. The image forming apparatus 100 is the so-called multi-function peripheral (MFP) having a printer function, a copy function, and a scanner function.

The client PC 200 is a general computer, and has an installed application to give a printing instruction to the printer controller 10.

Figure 2:
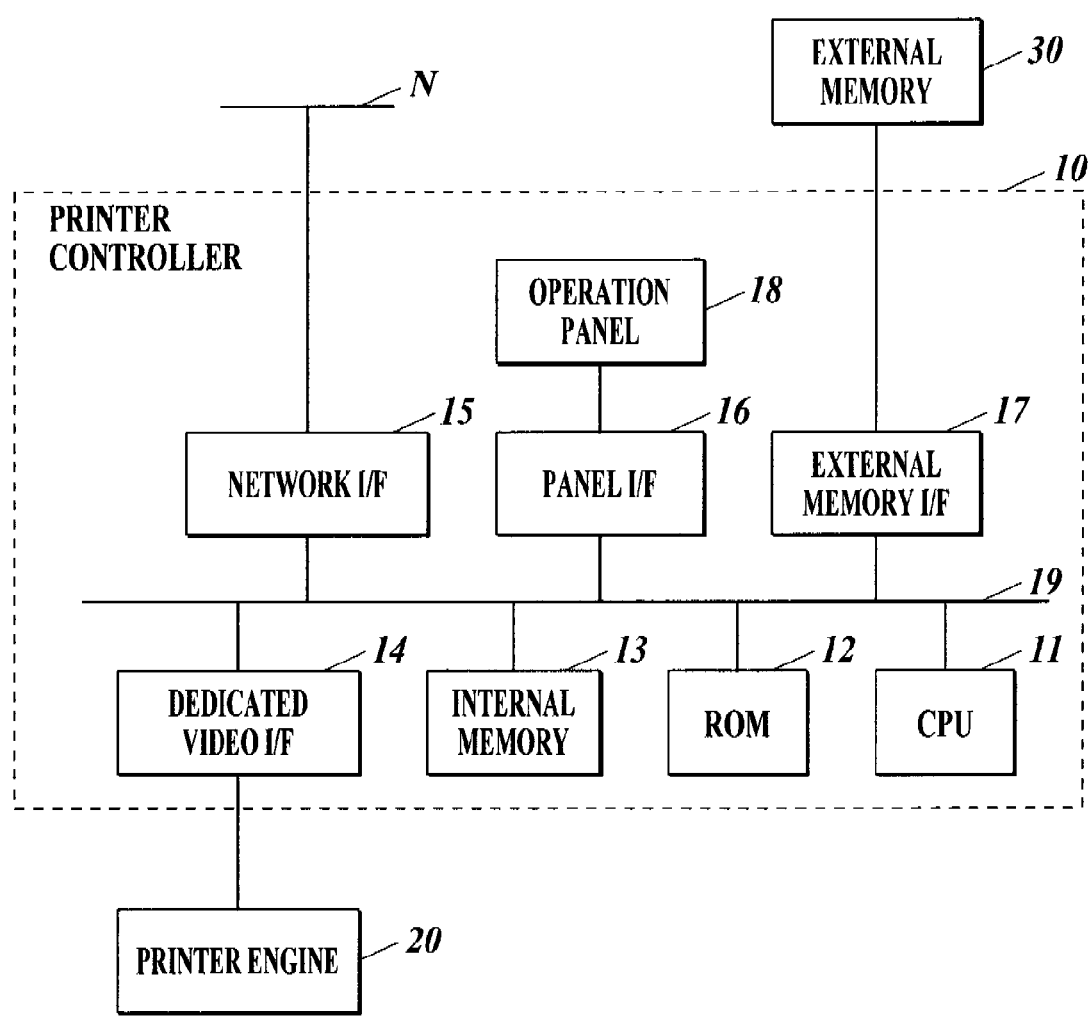
FIG. 2 is a block diagram showing the functional configuration of a printer controller.

FIG. 2 shows the functional configuration of the printer controller 10. As shown in FIG. 2, the printer controller 10 includes a central processing unit (CPU) 11, a read only memory (ROM) 12, an internal memory 13, a dedicated video interface (I/F) 14, a network I/F 15, a panel I/F 16, an external memory I/F 17, and an operation panel 18. The CPU 11, the ROM 12, the internal memory 13, the dedicated video I/F 14, the network I/F 15, the panel I/F 16, and the external memory I/F 17 are connected with one another through a system bus 19.

The CPU 11 loads a control program stored in the ROM 12 into the internal memory 13, and controls each section of the printer controller 10 and the printer engine 20 in corporation with the program to perform various kinds of processing. For example, the CPU 11 reads an image data file stored in an external memory 30 through the external memory I/F 17, and receives printing image data from the client PC 200 through the network I/F 15. Then, the CPU 11 generates printing data, such as bit map data, to output the generated printing data to the printer engine 20 through the dedicated video I/F 14.

The ROM 12 is made of a nonvolatile semiconductor memory or the like, and stores the control program, the data necessary to execute the program, and the like. For example, the ROM 12 previously stores a table including the file sizes, the data formats, the image forming conditions, and the memory occupying amounts of image data files, which are associated with one another. By referring to the table, a corresponding memory occupying amount can be obtained on the basis of the file size, the data format, the image forming condition of an image data file. The image forming condition means a condition for image formation, such as both side printing and aggregate printing (N in 1).

The internal memory 13 is composed of a random access memory (RAM), and forms a work area to temporarily store a control program executed by the CPU 11 and various kinds of data as the main memory. Moreover, the internal memory 13 stores the data such as the status of the printer engine 20, which data has been obtained from the dedicated video I/F 14.

The dedicated video I/F 14 performs the communication control at the time when the CPU 11 transmits printing data after being rasterized and engine control information to the printer engine 20, and at the time when the CPU 110 obtains status data from the printer engine 20.

The network I/F 15 performs communication control at the time of receiving printing image data from the client PC 200 through the network N, and at the time of transmitting various kinds of information of the image forming apparatus 100 to the client PC 200.

The panel I/F 16 is an interface to output display data of an operation screen and the like to the operation panel 18.

The external memory I/F 17 is an interface to connect the external memory 30 thereto.

The operation panel 18 is composed of a display section, such as a liquid crystal display (LCD), and a touch panel superposed on the LCD. The operation panel 18 displays various screens to display a state of the printer controller 10, operation results, and the like, on the basis of the display data input from the CPU 11 through the panel I/F 16. Moreover, the operation panel 18 detects the position on the touch panel contacted with a fingertip of a user, a touch pen, or the like when the user performs an operation or an input into the printer controller 10, and outputs a position signal to the CPU 11.

The printer engine 20 forming an image on the basis of the printing data transmitted from the printer controller 10 through the dedicated video I/F 14. The printer engine 20 performs, for example, electrophotographic printing system image formation, and is composed of a photosensitive drum, a charging section to charge the photosensitive drum, an exposing section to expose the surface of the photosensitive drum on the basis of printing data, a developing section to adhere toner to the photosensitive drum, a transferring section to transfer a toner image formed on the photosensitive drum to a sheet of paper, a fixing section to fix the toner image formed on the sheet of paper, and the like.

The external memory 30 is a memory detachably attachable to the printer controller 10, such as a USB memory, and stores various kinds of data. In the present embodiment, the external memory 30 stores a plurality of image data files. The data formats of these image data files are Portable Document Format (PDF), Joint Photographic Experts Group (JPEG), Tagged Image File Format (TIFF), PostScript (PS) (registered trade mark), Printer Control Language (PCL), XML Paper Specification (XPS), and the like.

The CPU 11 of the printer controller 10 calculates the residual capacity of the expansion memory to expand an image data file. If only the internal memory 13 is used as the expansion memory, then the CPU 11 calculates the residual capacity of the internal memory 13 by subtracting the memory usage of each functional module, such as a printing module, a copying module, and a scanning module, from the maximum capacity of the internal memory 13 that can be dynamically used by firmware.

If only the external memory 30 is used as the expansion memory, then the CPU 11 obtains the file sizes of the image data files stored in the external memory 30 by means of a file size calling function, file property information, and the like, and subtracts the memory usage of the aggregate of the file sizes of all the image data files stored in the external memory 30 from the maximum capacity of the external memory 30. Thus, the residual capacity of the external memory 30 is calculated.

If the internal memory 13 and the external memory 30 are used as the expansion memory, then the CPU 11 calculates the residual capacity of the internal memory 13 and the external memory 30 by adding up the residual capacity of the internal memory 13 and the residual capacity of the external memory 30.

Moreover, the CPU 11 predicts the memory occupying amount necessary to expand the image data files stored in the external memory 30 into the expansion memory. To put it concretely, the CPU 11 refers to the table stored in the ROM 12 to each image data file stored in the external memory 30 to obtain the memory occupying amount of the image data file in the case where no image forming conditions are set (default setting) on the basis of the file size and the data format of the image data file. The CPU 11 may predict the memory occupying amount further on the basis of the information such as whether the data of the image data file is color data or monochrome data, the ratio between images and characters, and the number of pages.

Moreover, the CPU 11 specifies the image formable image data files among the image data files stored in the external memory 30 on the basis of the residual capacity of the expansion memory and the memory occupying amount necessary to expand the image data files stored in the external memory 30.

Moreover, the CPU 11 displays the file names, the data formats, the file sizes, or the times necessary until image formation is started (hereinafter referred to as image formation starting times) of the specified image formable image data files onto the operation panel 18. The image formation starting time is the time from the reading of the image data file from the external memory 30 to the starting of image formation through the expansion of the read image data file into the expansion memory. To put it concretely, the CPU 11 calculates the image formation starting time in consideration of the speed of generating an intermediate file from an image data file (of PS, PCL, XPS, PDF, or the like), the speed of generating an output file (bit map data or the like) from the intermediate file, and the speed of each mode of the printer engine 20. In a system in which no intermediate files are generated, the CPU 11 calculates the image formation starting time in consideration of the speed of generating an output file from an image data file and the speed of each mode of the printer engine 20.

Moreover, the CPU 11 displays settable image forming conditions to the image data file that a user has selected among the image formable image data files displayed on the operation panel 18 on the operation panel 18. To put it concretely, the CPU 11 refers to the table stored in the ROM 12 as to the image data file that the user has selected to obtain the corresponding memory occupying amount on the basis of the file size, the data format, and the image forming conditions of the image data file, and compared the obtained memory occupying amount with the residual capacity of the expansion memory to obtain the settable image forming conditions. The user can set one or more image forming conditions among the displayed image forming conditions.

Moreover, if the CPU 11 uses the external memory 30 as the expansion memory, then the CPU 11 displays a screen for selecting whether to delete the temporary files such as the intermediate files generated on the basis of the image data file from the external memory 30 or not on the operation panel 18. Then, if a user has selected not to delete the temporary files from the external memory 30, then the CPU 11 displays the file names of the temporary files on the operation panel 18 together with the file names of the image formable image data files at the time of image formation of the image data files stored in the external memory 30.

Next, the operation of the printer controller 10 is described.

Figure 3:
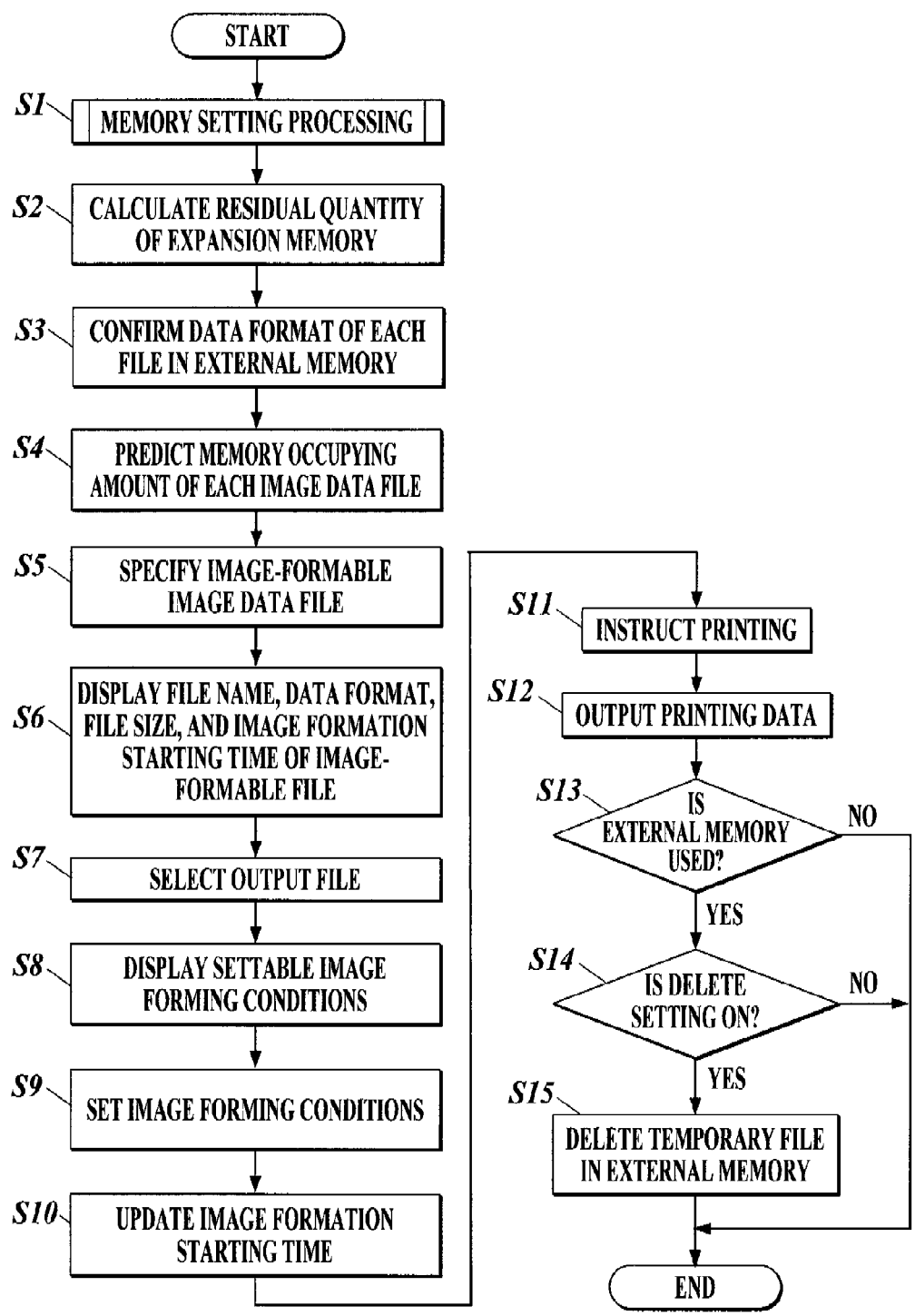
FIG. 3 is a flowchart showing the memory direct printing processing to be executed in the printer controller.

FIG. 3 is a flowchart showing the memory direct printing processing executed in the printer controller 10. The memory direct printing processing is realized by the software processing by the corporation of the CPU 11 and the programs stored in the ROM 12.

First, when the external memory 30 is connected to the external memory I/F 17, the CPU 11 performs memory setting processing to set a memory to be used as an expansion memory (Step S1).

Figure 4:
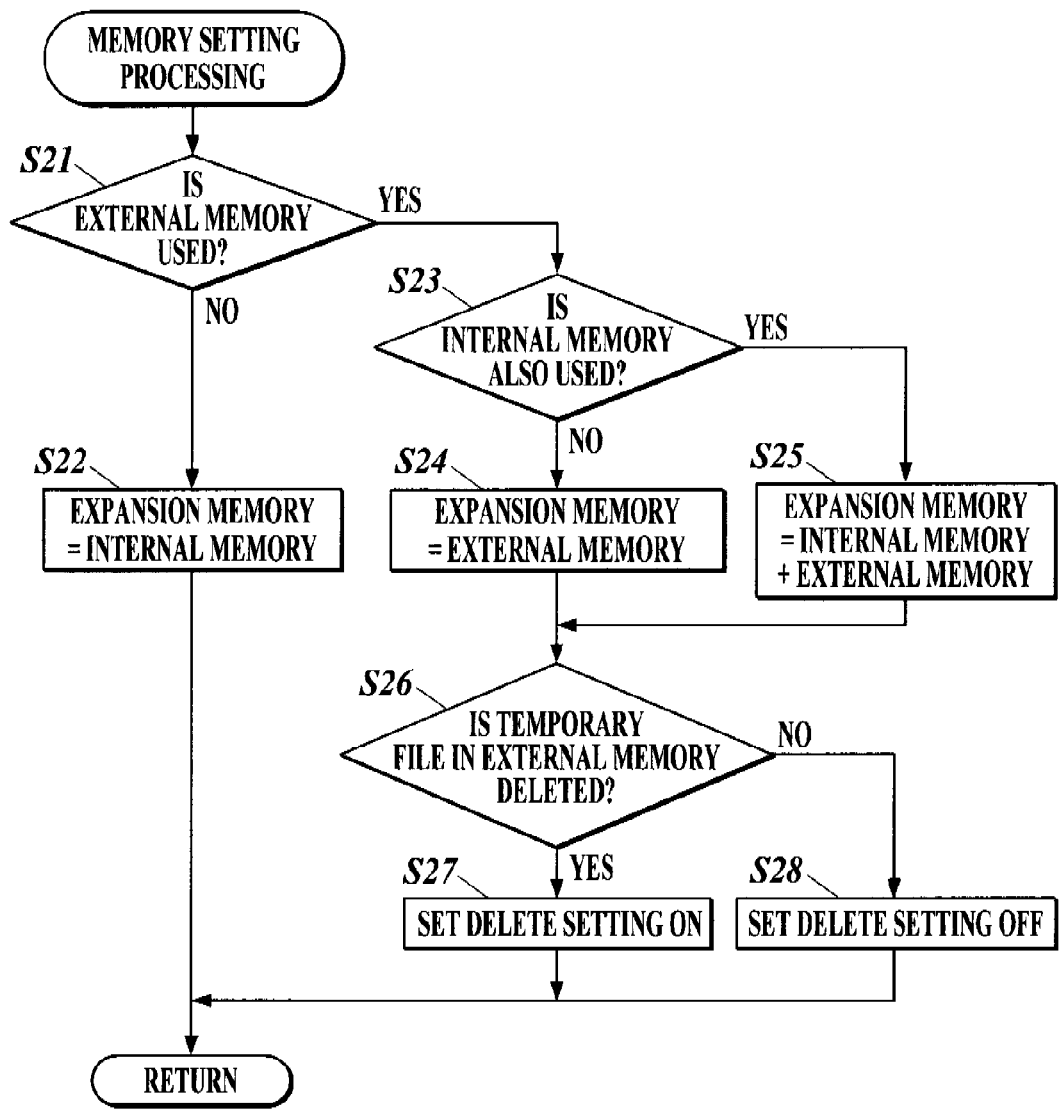
FIG. 4 is a flowchart showing memory setting processing.

By referring to FIG. 4, the memory setting processing is described.

Figure 5:
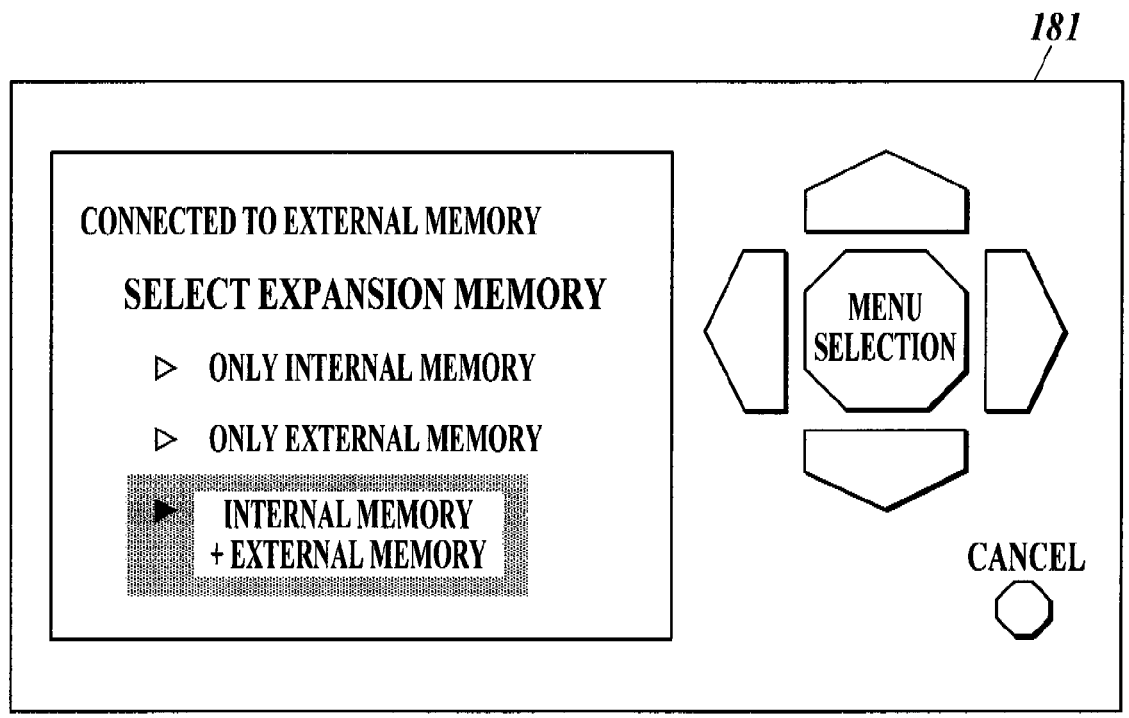
FIG. 5 is a view showing a display example of an expansion memory selecting screen.

First, the CPU 11 displays an expansion memory selecting screen 181, shown in FIG. 5, on the operation panel 18. A user selects any one of the items of "only internal memory," "only external memory," and "internal memory+external memory" as the expansion memory to expand image data files therein by operating the operation panel 18.

If the item of "only internal memory" is selected in the expansion memory selecting screen 181 (Step S21; NO), then the CPU 11 sets the internal memory 13 as the expansion memory (Step S22).

If the item of "only external memory" is selected in the expansion memory selecting screen 181 (Step S21; YES, Step S23; NO), then the CPU 11 sets the external memory 30 as the expansion memory (Step S24).

If the item of "internal memory+external memory" is selected in the expansion memory selecting screen 181 (Step S21; YES, Step S23; YES), the CPU 11 sets the internal memory 13 and the external memory 30 as the expansion memory (Step S25).

If the external memory 30 is used as the expansion memory (Step S21; YES), after the processing at Step S24 or Step S25, the CPU 11 displays a screen for selecting whether to delete temporary files, such as the intermediate files generated on the basis of the image data file, from the external memory 30 or not on the operation panel 18. The user selects whether to delete the temporary files in the external memory 30 or not by the operation of the operation panel 18.

If the user deletes the temporary files in the external memory 30 (Step S26; YES), then the Delete setting is set to be on (Step S27). On the other hand, if the temporary files in the external memory 30 are not deleted but are left to be saved (Step S26; NO), the Delete setting is set to be off (Step S28).

Next, as shown in FIG. 3, the CPU 11 calculates the residual capacity of the expansion memory (Step S2). If only the internal memory 13 is used as the expansion memory, then the CPU 11 subtracts the memory usage of each functional module from the maximum capacity of the internal memory 13 to calculate the residual capacity of the internal memory 13. If only the external memory 30 is used as the expansion memory, the CPU 11 subtracts the memory usage of the aggregate of the file sizes of all of the image data files stored in the external memory 30 from the maximum capacity of the external memory 30 to calculate the residual capacity of the external memory 30. If the internal memory 13 and the external memory 30 are used as the expansion memory, the CPU 11 adds up the residual capacity of the internal memory 13 and the residual capacity of the external memory 30 to calculate the residual capacity of the internal memory 13 and the external memory 30.

Next, the CPU 11 confirms the data format (such as PDF and JPEG) of each image data file in the external memory 30 to narrow down the files to the ones of the image formable data formats (Step S3).

Next, CPU 11 predicts the memory occupying amount necessary to expand each image data file that has the image formable data format among the respective image data files stored in the external memory 30 (Step S4). To put it concretely, the CPU 11 refers to the table stored in the ROM 12 to each image data file of the image formable data format to obtain the memory occupying amount in the case where no image forming conditions are set (default setting) on the basis of the file size and the data format of the image data file.

Next, the CPU 11 specifies the image formable image data files among the image data files stored in the external memory 30 on the basis of the residual capacity of the expansion memory calculated by the processing at Step S2 and the memory occupying amount of each image data file predicted by the processing at Step S4 (Step S5).

Next, the CPU 11 displays the file names, the data formats, the file sizes or the image formation starting times of the specified image formable image data files on the operation panel 18 (Step S6).

FIG. 6 shows an example of a file selecting screen 182 displaying image formable image data files. In the example shown in FIG. 6, the file names and the image formation starting times, and the file sizes of the image formable image data files are displayed. Moreover, the data formats of the files are also displayed as the extensions of the file names. When the file names, the image formation starting times, the file sizes, the data formats, and the like, are displayed, they can be sorted in accordance with a previously set priority order. For example, if the image data files are displayed on the basis of the file names, the file names are displayed as a list in which they are arranged in the alphabetic order. Moreover, if the image data files are displayed on the basis of the image formation starting times, the image data files are arranged in ascending length order or in descending length order of image formation starting times to be displayed as a list. Moreover, if the image data files are displayed on the basis of the file sizes, the image data files are arranged in ascending size order or in descending size order of the file sizes to be displayed as a list. Moreover, only necessary items among the file names, the image formation starting times, the file sizes, the data formats, and the like, may be displayed by a selection of the user.

Next, when the user selects a file to be output among the image formable image data files displayed on the operation panel 18 (Step S7), the CPU 11 displays the image forming conditions settable for the selected image data file on the operation panel 18 (Step S8). To put it concretely, the CPU 11 refers to the table stored in the ROM 12 as to the image data file selected by the user to obtain the corresponding memory occupying amount on the basis of the file size, the data format, and the image forming condition of the image data file. The CPU 11 compares the obtained memory occupying amount with the residual capacity of the expansion memory to obtain the settable image forming condition.

Figure 7:
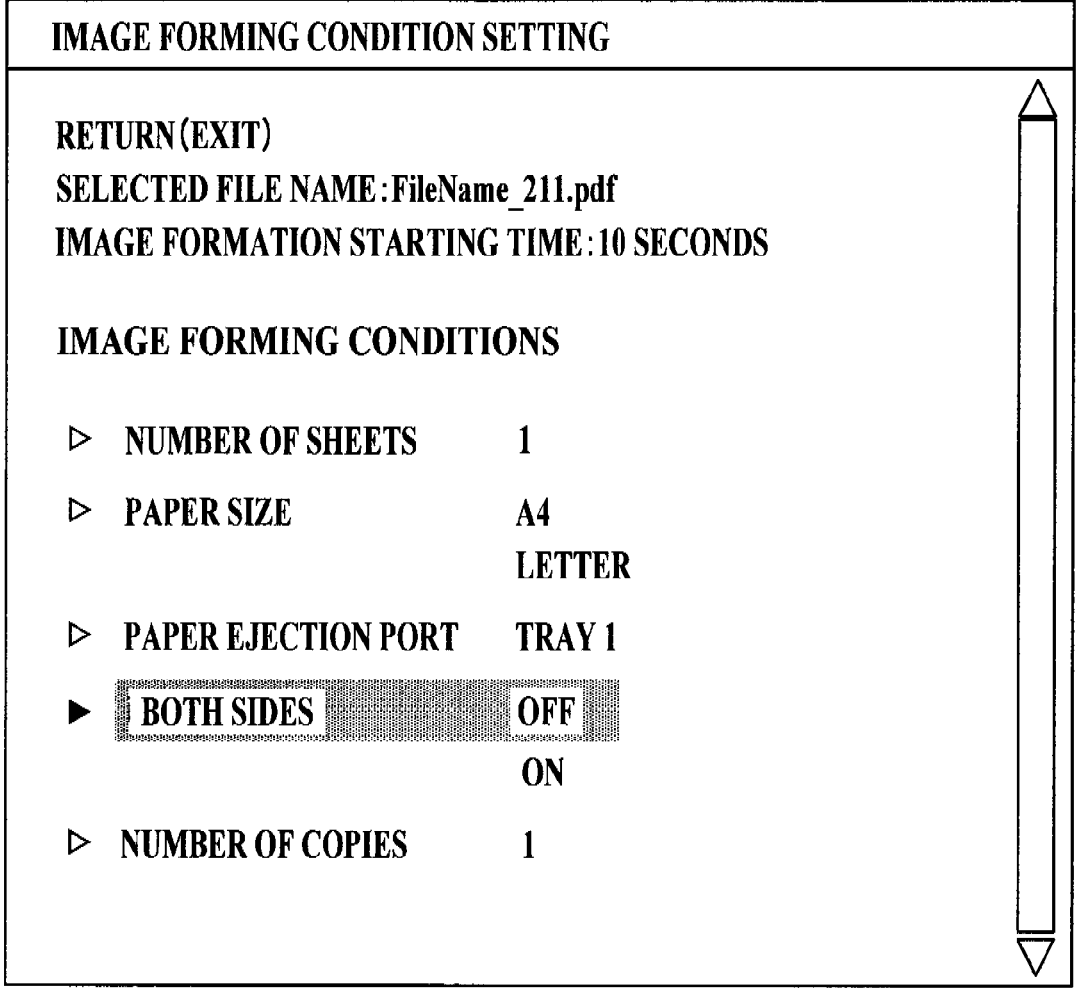
FIG. 7 is a view showing a display example of an image forming condition setting screen.

FIG. 7 shows an example of an image forming condition setting screen 183 to display settable image forming conditions. In the example shown in FIG. 7, a number of sheets, a paper size, a paper ejection port, both sides on/off, and a number of copies are displayed to the selected file "FileName_211.pdf" as the settable image forming conditions.

Next, when the user sets wanted image forming conditions among the image forming conditions displayed on the set operation panel 18 (Step S9), the CPU 11 updates the image formation starting time of the selected image data file according to the set image forming conditions (Step S10).

Next, when the user confirms the file name, the image forming conditions, the image formation starting time of the selected image data file, and gives a printing instruction (Step S11), the CPU 11 outputs printing data to the printer engine 20 through the dedicated video I/F 14 (Step S12). The printer engine 20 forms an image on the basis of the printing data. The CPU 11 displays that it is prohibited to pull out the external memory 30 until the end of printing after the printing instruction at Step S11 on the operation panel 18, and displays that the pulling out of the external memory 30 is allowed after the end of printing on the operation panel 18.

Next, if the external memory 30 is used as the expansion memory (Step S13; YES), then the CPU 11 judges whether Delete setting is set to be on or not (Step S14). If Delete setting is set to be on (Step S14; YES), then the CPU 11 deletes temporary files saved in the external memory 30 (Step S15).

Figure 8:
FIG. 8 is a view showing a display example of the file selecting screen in the case where a temporary file is saved in an external memory.

On the other hand, if Delete setting is set to be off (Step S14; NO), then the CPU 11 does not delete the temporary files saved in the external memory 30, and leaves the temporary files to be saved as they are. The temporary files saved in the external memory 30 will be displayed on the operation panel 18 to be capable of being selected at Step S6 in the next processing. FIG. 8 shows an example of a file selecting screen 184 in the case where temporary files are saved in the external memory 30. The file selecting screen 184 displays a temporary file "FileName_211.prn" 186 generated from the file "FileName_211.pdf" 185. The user can select the temporary file "FileName_211.prn" 186 on the operation panel 18. The time of the printing of a temporary file to the output thereof is shortened.

If the external memory 30 is not used as the expansion memory in the processing at Step S13 (Step S13; NO), the processing ends as it is.

As described above, according to the image forming apparatus 100, the residual capacity of the expansion memory is calculated, and the memory occupying amount necessary to expand image data files into the expansion memory are predicted. Then, image formable image data files are specified among the image data files stored in the external memory 30 on the basis of the residual capacity of the expansion memory and a predicted memory occupying amount, and only the file names of the image formable image data files are displayed on the operation panel 18. Consequently, the usability of the image data files stored in the external memory 30 at the time of image formation can be improved. Because there are no cases where, after an image data file has been selected, it becomes clear that the image formation of the selected image data file is impossible owing to memory lack, the user can comfortably perform operation without feeling any stress.

Moreover, the data formats, the file sizes, the image formation starting times are displayed together with the file names of image formable image data files, and thereby these pieces of information can be informed to a user.

Moreover, the settable image forming conditions of image formable image data files can be informed to a user.

Moreover, because any of the items of "only internal memory," "only external memory," and "internal memory+ external memory" can be selected as the expansion memory, the expansion memory can be selected according to the using method of a user.

Moreover, if the way of not deleting temporary files from the external memory 30 is selected when the external memory 30 is used as the expansion memory, as shown in FIG. 8, the file names of the temporary files are displayed on the operation panel 18 together with the file names of image formable image data files, image formation can be performed by using the temporary files.

Incidentally, although the file names, the data formats, the file sizes or the image formation starting times of the image formable image data files among the image data files stored in the external memory 30 are displayed on the operation panel 18 in the embodiment mentioned above, the file names, the data formats, the file sizes, and the like, of the image data files the image formation of which is impossible may be displayed in order to make it possible for the user to recognize that the image formation of those image data files is impossible. Moreover, the memory occupying amount necessary to expand the image data files the image formation of which is judged to be impossible may be displayed on the operation panel 18. Moreover, the memory information of other image forming apparatus may be previously obtained as a data base, and the image forming apparatus 100 may be configured to display an image formable image forming apparatus when an image data file that the image forming apparatus 100 cannot form an image is selected.

Moreover, if there is no image data file that can be formed as an image among the image data files stored in the external memory 30, then the effect that there is no image formable image data file may be displayed on the operation panel 18 to be informed to the user.

Moreover, the image data files to be deleted may be set to be selectable among the image formable image data files displayed in the processing at Step S6 in FIG. 3, and the selected image data files may be deleted. If the residual capacity of the external memory 30 increases by deleting unnecessary image data files, there is a possibility of increasing image formable image data files.

Moreover, although a description has been given to the display of the file names and the like of the image formable image data files in the case of using the expansion memory set in the memory setting processing (see FIG. 4) in the embodiment described above, the file names and the like of the image formable image data files may be displayed in the case of using each of the cases of "only internal memory," "only external memory," and "internal memory+external memory" as the expansion memory.

Moreover, although a description has been given to the case where the settable image forming conditions of the image data file selected by the user are displayed on the operation panel 18 in the embodiment described above, the capability of image formation, the image formation starting times, and the like, of all combinations of each image forming condition may be displayed at the time of displaying the image data files stored in the external memory 30 like an image forming condition selecting screen 187 shown in FIG. 9.

In the example shown in FIG. 9, if each of a condition A, a condition B, and a condition C is off (in the case of default setting), then the state is image formable, and the image formation starting time is 10 seconds. Moreover, if only the condition A is turned on, then the state is image formable, and the image formation starting time is 13 seconds. Moreover, if only the condition B is turned on, then the state is the one in which image formation is impossible. Moreover, if only the condition C is turned on, then the state is image formable, and the image formation starting time is 23 seconds. In this case, a user selects an image formable combination among the combinations of displayed image forming conditions to perform a printing instruction.

According to one aspect of the preferred embodiment of the present invention, an image forming apparatus to form an image on a basis of an image data file stored in an external memory, includes: an expansion memory to expand the image data file; a memory residual capacity calculating section to calculate a residual capacity of the expansion memory; a memory occupying amount predicting section to predict a memory occupying amount necessary to expand the image data file into the expansion memory; a specification section to specify an image formable image data file which is processable by the image forming apparatus among the image data files stored in the external memory on a basis of the residual capacity of the expansion memory and the memory occupying amount, and a display controlling section to display a file name of the specified image formable image data file in a display section.

Because the image forming apparatus displays only the file names of the image formable image data file, the usability of the image data files stored in the external memory at the time of image formation can be improved.

Preferably, in the image forming apparatus, the display controlling section further displays at least one of a data format, a file size, and a time necessary for starting image formation of the image formable image data file in the display section.

The image forming apparatus can inform a user of the data format, the file size, or the time necessary for starting the image formation of the image formable image data file.

Moreover, preferably, in the image forming apparatus, the display controlling section further displays an image forming condition settable for the image formable image data file in the display section.

The image forming apparatus can inform a user of the settable image forming condition of the image formable image data file.

Moreover, preferably, in the image forming apparatus, the expansion memory is an internal memory provided in the image forming apparatus and/or the external memory.

The image forming apparatus can select the expansion memory according to the using method of a user.

Moreover, preferably, the image forming apparatus further includes a selection section for selecting whether to delete a temporary file generated on a basis of the image data file from the external memory or not in a case of using the external memory as the expansion memory, wherein the display controlling section displays a file name of the temporary file together with the file name of the image formable image data file in the display section when the temporary file is selected not to be deleted from the external memory.

The image forming apparatus can form an image using the temporary file in the case where the not deleting of any temporary files from the external memory is selected.

According to one aspect of the preferred embodiment of the present invention, a computer-readable medium embodies a program to allow a computer controlling an image forming apparatus which forms an image on a basis of an image data file stored in an external memory, to function as the sections of: a memory residual capacity calculating section to calculate a residual capacity of an expansion memory to expand the image data file; a memory occupying amount predicting section to predict a memory occupying amount necessary to expand the image data file into the expansion memory; a specification section to specify an image formable image data file which is processable by the image forming apparatus among the image data files stored in the external memory on a basis of the residual capacity of the expansion memory and the memory occupying amount, and a display controlling section to display a file name of the specified image formable image data file in a display section.

Because only the file name of the image formable image data file is displayed by the computer-readable medium, the usability at the time of image formation of the image data file stored in the external memory can be improved.

Preferably, in the computer-readable medium, the display controlling section further displays at least one of a data format, a file size, and a time necessary for starting image formation of the image formable image data file in the display section.

The computer-readable medium can inform the user of the data format, the file size, or the time necessary for starting the image formation of the image formable image data file.

Moreover, preferably, in the computer-readable medium, the display controlling section further displays an image forming condition settable for the image formable image data file in the display section.

The computer-readable medium can inform the user the image forming condition settable for the image formable image data file.

Moreover, preferably, in the computer-readable medium, the expansion memory is an internal memory provided in the image forming apparatus and/or the external memory.

The computer-readable medium can select the expansion memory according to the using method of the user.

Moreover, preferably, in the computer-readable medium, the computer-readable medium stores a program to allow the computer to further function as a selection section for selecting whether to delete a temporary file generated on a basis of the image data file from the external memory or not in a case of using the external memory as the expansion memory, and the display controlling section displays a file name of the temporary file together with the file name of the image formable image data file in the display section when the temporary file is selected not to be deleted from the external memory.

The computer-readable medium can form an image by using the temporary file when the not deleting of the temporary file from the external memory is selected.

What is claimed is:

1. An image forming apparatus configured to form an image on a basis of an image data file selected from a plurality of image data files stored in an external memory, comprising:
   an expansion memory to expand the image data file;
   a memory residual capacity calculating section to calculate a residual capacity of the expansion memory;
   a memory occupying amount predicting section to predict a memory occupying amount necessary to expand the image data file into the expansion memory;
   a specification section to specify an image formable image data file, from among the plurality of image data files stored in the external memory, for which sufficient residual capacity of the expansion memory exists for expanding the image formable image data file on a basis of the residual capacity of the expansion memory being larger than the memory occupying amount of the image data file, before a selection of the image data file for image formation is received from a user; and
   a display controlling section to display a file name of the image formable data file specified by the specification section in a display section for receiving from the user the selection of the image data file for image formation;
   wherein the specification section specifies the image formable image data before the display controlling section displays a file name of the image formable data file.

2. The image forming apparatus of claim 1, wherein the display controlling section further displays at least one of a data format, a file size, and a time necessary for starting image formation of the image formable image data file in the display section.

3. The image forming apparatus of claim 1, wherein the display controlling section further displays an image forming condition settable for the image formable image data file in the display section.

4. The image forming apparatus of claim 1, wherein the expansion memory is either an internal memory provided in the image forming apparatus, the external memory, or a combination of both the internal memory and the external memory.

5. The image forming apparatus of claim 4, further comprising a selection section for selecting whether to delete a temporary file generated on a basis of the image data file from the external memory or not in a case of using the external memory as the expansion memory, wherein
   the display controlling section displays a file name of the temporary file together with the file name of the image formable image data file in the display section when the temporary file is selected not to be deleted from the external memory.

6. A non-transitory computer-readable medium embodying a program to allow a computer controlling an image forming apparatus which forms an image on a basis of an image data file selected from a plurality of image data files stored in an external memory, to function as the sections of:
   a memory residual capacity calculating section to calculate a residual capacity of an expansion memory to expand the image data file;
   a memory occupying amount predicting section to predict a memory occupying amount necessary to expand the image data file into the expansion memory;
   a specification section to specify an image formable data file, from among the plurality of image data files stored in the external memory, fhr which sufficient residual capacity of the expansion memory exists for expanding the image formable image data file on a basis of the residual capacity of the expansion memory being larger than the memory occupying amount of the image data file, before a selection of the image data file for image formation is received from a user; and
   a display controlling section to display a file name of the image formable image data file specified by the specification section in a display section for receiving from the user the selection of the image data file for image formation;
   wherein the specification section specifies the image formable image data before the display controlling section displays a file name of the image formable data file.

7. The non-transitory computer-readable medium of claim 6, wherein the display controlling section further displays at least one of a data format, a file size, and a time necessary for starting image formation of the image formable image data file in the display section.

8. The non-transitory computer-readable medium of claim 6, wherein the display controlling section further displays an image forming condition settable for the image formable image data file in the display section.

9. The non-transitory computer-readable medium of claim 6, wherein the expansion memory is either an internal memory provided in the image forming apparatus, the external memory, or a combination of both the internal memory and the external memory.

10. The non-transitory computer-readable medium of claim 9, wherein
    the computer-readable medium stores a program to allow the computer to further function as a selection section for selecting whether to delete a temporary file generated on a basis of the image data file from the external memory or not in a case of using the external memory as the expansion memory, and
    the display controlling section displays a file name of the temporary file together with the file name of the image formable image data file in the display section when the temporary file is selected not to be deleted from the external memory.

11. A method of forming an image with an image forming apparatus on a basis of an image data file selected from a plurality of image data files stored in an external memory, the method comprising:
    calculating a residual capacity of an expansion memory to expand the image data file;
    predicting a memory occupying amount necessary to expand the image data file into the expansion memory;
    specifying an image formable data file, from among the plurality of image data files stored in the external memory, for which sufficient residual capacity of the expansion memory exists for expanding the image formable image data file on a basis of the residual capacity of the expansion memory being larger than the memory occupying amount of the image data file, before a selection of the image data file for image formation is received from a user;

displaying a file name of the image formable image data file specified by the specification section in a display section for receiving from the user the selection of the image data file for image formation;

wherein the specifying an image formable data file occurs before the displaying a file name of the image formable image data file.

* * * * *